United States Patent [19]

Cosgrove

[11] Patent Number: 5,157,482
[45] Date of Patent: Oct. 20, 1992

[54] USE OF PRE-SCANNED LOW RESOLUTION IMAGERY DATA FOR SYNCHRONIZING APPLICATION OF RESPECTIVE SCENE BALANCE MAPPING MECHANISMS DURING HIGH RESOLUTION RESCAN OF SUCCESSIVE IMAGES FRAMES ON A CONTINUOUS FILM STRIP

[75] Inventor: Patrick A. Cosgrove, Rochester, N.Y.

[73] Assignee: Eastman Kodak Company, Rochester, N.Y.

[21] Appl. No.: 583,420

[22] Filed: Sep. 17, 1990

[51] Int. Cl.$^5$ .............................................. H04N 9/11
[52] U.S. Cl. .................................... 358/54; 358/214; 355/41; 355/77
[58] Field of Search ................ 358/54, 214, 29 C, 29, 358/80, 78, 163, 38, 76, 401, 447, 483, 487, 75; 355/41, 68, 77, 38

[56]    References Cited
U.S. PATENT DOCUMENTS

| | | | |
|---|---|---|---|
| 3,637,920 | 1/1972 | Becker et al. | 358/29 C |
| 4,096,523 | 6/1978 | Belmares-Sarabia et al. | 358/80 |
| 4,097,892 | 6/1978 | Balding | 358/80 |
| 4,272,780 | 6/1981 | Belmares-Sarabia et al. | 358/54 |
| 4,418,353 | 11/1983 | Poetsch et al. | 358/54 |
| 4,627,719 | 12/1986 | Nitsch et al. | 355/41 |
| 4,642,684 | 2/1987 | Alkofer | 358/80 |
| 4,656,525 | 4/1987 | Norris | 356/76 |
| 4,666,307 | 5/1987 | Matsumoto et al. | 358/29 C |
| 4,668,082 | 5/1987 | Terashita et al. | 355/77 |
| 4,679,095 | 7/1987 | Kitamura et al. | 358/280 |
| 4,736,245 | 4/1988 | Seto et al. | 358/80 |
| 4,769,695 | 9/1988 | Terashita | 358/76 |
| 4,777,525 | 10/1988 | Preston, Jr. | 358/102 |
| 4,829,370 | 5/1989 | Mayne et al. | 358/78 |
| 4,845,551 | 7/1989 | Matsumoto | 358/163 |
| 4,893,345 | 1/1990 | Matsumoto | 382/1 |
| 4,899,212 | 2/1990 | Kaneko et al. | 358/29 |
| 4,933,713 | 6/1990 | Tsuji et al. | 355/41 |
| 4,947,205 | 8/1990 | Benker et al. | 355/41 |
| 4,987,440 | 1/1991 | Benker et al. | 355/41 |
| 5,060,061 | 10/1991 | Shishido et al. | 358/80 |

Primary Examiner—John K. Peng
Assistant Examiner—Michael H. Lee
Attorney, Agent, or Firm—Edward Dugas

[57] ABSTRACT

A plurality of color photographic images that have been captured on a continuous color photographic film strip are pre-scanned at low resolution and then re-scanned at high resolutin by an opto-electronic scanning device and processed for storage as a plurality of digitized images in a digital imagery data base. The film strip contains notches to spatially locate pre-scan frame data during rescan. During pre-scan the film strip is translated past an opto-electronic scanner in a first direction to obtain a plurality of first digitally encoded images. During high resolution rescan, the film strip is translated in the reverse direction. The high resolution imagery data is mapped into image storage memory on the basis of the contents of respective first digitally encoded images. During the rescan the mapping process is calibrated on the basis of information contained on the film strip other than the notches, such as detected interframe gaps and a correlation of low resolution and high resolution frame 'fingerprints'.

19 Claims, 1 Drawing Sheet

5,157,482

USE OF PRE-SCANNED LOW RESOLUTION IMAGERY DATA FOR SYNCHRONIZING APPLICATION OF RESPECTIVE SCENE BALANCE MAPPING MECHANISMS DURING HIGH RESOLUTION RESCAN OF SUCCESSIVE IMAGES FRAMES ON A CONTINUOUS FILM STRIP

FIELD OF THE INVENTION

The present invention relates in general to digital imagery processing systems and is particularly directed to a scheme for using image frame identification information, derived during a low resolution scan of successive image frames on a continuous film strip, to spatially synchronize the control of a subsequent reverse-direction, high resolution scan of each of previously scanned image frames on a reel of color photographic film containing that film strip.

BACKGROUND OF THE INVENTION

Photofinishing systems customarily prescan a strip of (35 mm) film to examine the quality and color content of the respective image frames prior to transferring the images to print paper. On the basis of this prescan examination, exposure control parameters of the imaging optics components are defined so that, during a subsequent pass of the film, the projection of each image onto the print medium will be properly adjusted to yield an acceptable quality hard copy print.

In order to demarcate where each image is located on the film strip, respective notches are formed along the edge of the film, for example between successive frames, or centrally of each frame. During rescan, these notches are used to identify successive frames and thereby call up previously defined exposure control parameters for adjusting the projection optics.

A shortcoming of such an exposure control procedure is the fact that a notch is sometimes missed. When this happens, there is a mismatch between the current image frame and prescan-derived exposure control parameters. The result is a poor quality set of prints, making it necessary for the photofinisher to reprocess the film strip, which entails additional time, and costs associated with the wasted print materials. Now although a minor lag in processing can be adequately managed, when a large reel of film is to be scanned continuously on a single machine and then printed on the same (or other) machine, it is too complex to track and detect possible sequence errors. As a result, almost no equipment currently available attempts to track such errors over multiple film strips.

SUMMARY OF THE INVENTION

In accordance with the present invention, the above-described spatial synchronization problem is effectively obviated by using supplemental or auxiliary information derived during the prescan of the image, thereby augmenting the function of each notch so that even if a notch is missed during rescan, spatial synchronization between each frame and its associated prescan-derived control information will be maintained. The present invention is particularly applicable to a highly automated digital imagery processing system, wherein successive image frames of a continuous reel of color photographic film, such as a spliced-together sequence of 35 mm film strips, are prescanned in a first order at low spatial resolution and then rescanned in reverse order to derive a color balanced, high spatial resolution digitized image for each frame.

In such a digital imagery processing system, each frame on the film is pre-scanned at low resolution, with each digitized image being processed by a scene balance mechanism for deriving control information to be used for optimizing the manner in which a subsequently scanned high resolution digitized image is to be mapped into memory. The scene balance mechanism determines how the response characteristic of the scanner's imaging pixel array sees the image and encodes its spatial content. The output of this analysis, which represents the color balance content of the digitized image, is then used to adjust, or calibrate, the sensitivity parameters of the scanner during the high resolution scan, so that the essential subject matter of the image (i.e. that which is necessary to reproduce a high quality image) will fall within the linear portion of the response range of the scanner's imaging pixel array. The high resolution digitized image is then processed by the scene balance mechanism to map the image data into a digitized image having a reduced encoding resolution corresponding to that of an attendant framestore.

In such a system, should there be a mismatch between prescan imagery data and a high resolution frame, the wrong prescan-based calibration information would be used during the high resolution scan, and an unacceptable image would be mapped into memory. To prevent this from happening, the present invention does not rely exclusively on detecting frame location notches as in conventional (analog) systems, but uses other detected frame identification information that may be used independently of, or in combination with, the notches to improve the reliability of the scanner calibration for each processed image.

Pursuant to the invention, a reel of color photographic film (comprised of one or more spliced together film strips) is initially translated in a first direction past a selectable resolution opto-electronic film scanner which scans the images on the film at a first, low resolution, thereby producing a plurality of first digitally encoded images. For each pre-scanned image a first signal, in the form of a first digital code representative of a prescribed attribute of that scanned image, is generated and stored. This first code may represent a statistical measure of the contents of the image, e.g. a summation of the image contents of each of the columns of the low spatial resolution pixel sub-array. Alternatively, or in addition to the first code, a second code, representative of the location of a respective interframe gap, namely, a separation between successive images on the film strip, may be generated. The location of interframe gaps is readily accomplished by observing what is effectively a stepwise variation in the output of the scanner as non-image regions of the film are scanned during the film's movement past the scanner's imaging optics. Each of the plurality of first digitally encoded images is then processed in accordance with a scene balance mechanism to derive a calibration code representative of the color content of the image.

After the entire reel has been scanned at low resolution and first, second and scanner calibration codes have been stored for each image, the photographic film strip is translated past the opto-electronic scanning device in a reverse direction, so as to effect a rescanning of the plurality of photographic images, but in an order opposite to that of the original scan. The rescan of each image (which may be conducted on the same or a different film scanner) is conducted at a second, high spatial scanning resolution to produce a plurality of second digitally encoded images. During the rescan of each image, a third signal, in the form of a third digital code, representative of the prescribed attribute of the scanned image, is generated and stored. As in the case of the first code, the third signal may represent a statistical measure of the contents of the image, such as a summation of the image contents of those columns of the image array corresponding to the columns of the low spatial resolution pixel sub-array. Each second digitally encoded image is then mapped into memory using a scene balance mechanism that has been calibrated in accordance with a respective scene balance calibration signal.

To ensure that the correct calibrated scene balance mechanism is employed during the high resolution scan, its selection may be based upon a combination (e.g. correlation) of the first and third statistical measure representative codes, or by looking for the presence of an interframe gap, as represented by the second code, in addition to a frame demarcating notch. Namely, notch information is augmented by other data that is derived during pre-scan of the film.

DETAILED DESCRIPTION

Figure 1:
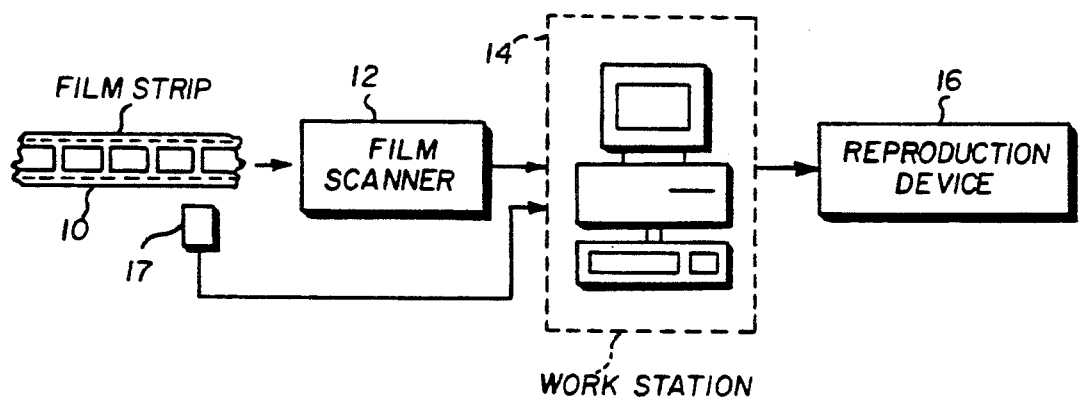
FIG. 1 diagrammatically illustrates a photographic color film photofinishing minilab for continuous processing of a reel of spliced-together color photographic film strips.

Before describing, in detail, the inventive use of pre-scanned low resolution imagery data to synchronize the application of a plurality of scene balance mapping mechanisms during high resolution scanning of successive images frames on a continuous film strip, it should be observed that the present invention resides primarily in a novel structural combination of conventional digital imagery processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

FIG. 1 diagrammatically illustrates a photographic color film processing system (e.g. photofinishing minilab) with which the present invention may be employed and, for purposes of the present description, such a system may be of the type described in co-pending patent application Ser. No. 582,305, filed Sep. 14, 1990, by S. Kristy, entitled "Multi-resolution Digital Imagery Photofinishing System", assigned to the assignee of the present application and the disclosure of which is herein incorporated. It should be observed, however, that the system described in the above-referenced co-pending Kristy application is merely an example of one type of system in which the invention may be used and is not to be considered limitative of the invention. In general, the invention may be incorporated in any digitized imagery processing and reproduction system.

In accordance with the imagery data processing system of the above referenced co-pending Kristy application, each high resolution captured image is preferably formatted and stored as a respective image data file containing a low, or base, resolution image bit map file and a plurality of higher resolution residual images associated with respectively increasing degrees of image resolution. By iteratively combining these higher resolution residual images with the base resolution image, successively increased resolution images may be recovered from the base resolution image. As an example, spatial data values representative of a high resolution (3072×2048) image scan of a 36 mm-by-24 mm image frame of a 35 mm film strip may be stored as a respective image data file including a base resolution image bit map file containing data values associated with a spatial image array or matrix of 512 rows and 768 columns of pixels and an associated set of residual image files to be stored on the disc. Within a photofinishing workstation, the base resolution image may be further sub-sampled to derive an even lower resolution sub-array of image values (e.g. on the order of 128×192 pixels) for use by the photofinishing operator in the course of formatting and storing a digitized image file.

Thus, in the digital image processing system of FIG. 1, color photographic images, such as a set of twenty-four or thirty-six 36 mm-by-24 mm image frames of a 35 mm color film strip 10, are scanned by a high resolution opto-electronic color film scanner 12, such as a commercially available Eikonix Model 1435 scanner. High resolution film scanner 12 outputs digitally encoded data representative of the response of its imaging sensor pixel array (e.g. a 2048×3072 pixel matrix) onto which a respective photographic image frame of film strip 10 has been projected by an input imaging lens system. This digitally encoded data, or 'digitized' image, is encoded to some prescribed resolution (e.g. sixteen bits per color per pixel) that encompasses a range of values over which the contents of the scene on the color film may vary. For a typical color photographic negative, the range of values is less than the density vs. exposure latitude of the film, but is sufficiently wide to encompass those density values that can be expected to be encountered for a particular scene. Also shown in FIG. 1 is a notch detector 17 which detects frame location notches in film strip 10 for synchronization purposes, as will be described below.

Because of its very large (2048×3072) spatial resolution, with the output of each pixel being resolved to sixteen bits, the quantity of data per image produced by such high resolution film scanners is so large that it must be reduced for storage and reasonably fast access in a practical sized framestore, which necessarily implies that some of the scene information in the digitized image will be discarded. For this purpose, a scene balancing mechanism is used to map the digitized image into a set of lower resolution digital codes (e.g. eight bits per color per pixel), each of which has a resolution corresponding to the dynamic range of a digitized image data base (framestore). The database may be resident in a photofinishing workstation 14, which contains imagery application software through which the digitized image may be processed to achieve a desired base image appearance and configuration in the course of driving a high resolution thermal printer 16 to output a high quality color print.

Preferably, in the course of being mapped into memory, the digitized imagery data output by the high resolution film scanner is subjected to a code conversion mechanism of the type described in co-pending application Ser. No. 582,306, filed Sep. 14, 1990, by T. Madden et al, entitled "Extending Dynamic Range of Stored Image Database," assigned to the assignee of the present application and the disclosure of which is herein incorporated. Pursuant to this code conversion scheme, the dynamic range of the digitized image database may be extended to permit shifting of encoded pixel values without 'clipping', and to provide a limited window of values into which extremely high reflectance image points may be encoded and stored. To this end, digital codes, into which the high resolution imagery data output by the image scanner are mapped by the scene balance mechanism, are converted into a set of reduced-range digital codes of the same resolution as, but having a smaller range of image content values than the dynamic range of the digitized image data base. The code conversion mechanism operates to convert a maximum value of 100% white reflectance to an encoded value that is less than the upper limit of the dynamic range of the database to accommodate shifts in the digitized imagery data and allow for the placement of specular highlights that are beyond the 100% white reflectance maximum.

Figure 2:
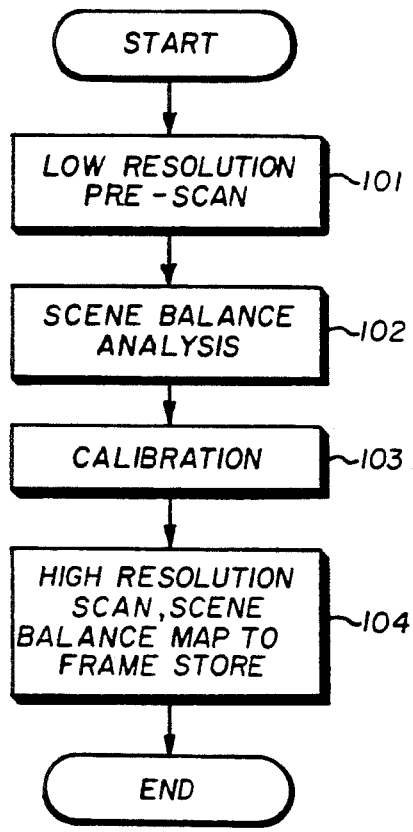
FIG. 2 is an imagery processing flow diagram of a low resolution scene balance based calibration and high resolution imagery digitizing mechanism.

When digitizing an image during a high resolution scan, the response of the scanner is calibrated such that the principal subject matter of the image falls within the linear portion of the response range of the scanner's imaging pixel array. For this purpose, as described in my co-pending application Ser. No. 583,414, filed Sep. 17, 1990 entitled "Scene Balance Calibration of Digital Scanner", assigned to the assignee of the present application and the disclosure of which is herein incorporated, the digital imagery processing system employs a calibration and high resolution capture procedure, diagrammatically illustrated in the imagery processing flow diagram of FIG. 2, whereby the image is scanned twice, once at low resolution for purposes of calibration, and then at high resolution, for data capture.

More particularly, as shown at step 101, image scanner 12 is controlled to carry out a low resolution mode, prescan of an image 10 of interest. Where the scanner has multiple resolution scan capability, it is controlled so as to scan the image at a relatively low spatial resolution, e.g. on the order of 24×36 pixels per frame. Depending upon the size of the low resolution image, it may be necessary to perform a further spatial compression of the captured image, in order to reduce the computational intensity (and thereby achieve a reasonably rapid throughput) of the application of the low resolution image to a scene balance mechanism. In accordance with the multiple mode operation of the above-referenced high resolution scanner, during low resolution scan, a 128×192 image is captured. Through further spatial integration of the imagery data within workstation 14, the captured 128×192 pixel version of the image may be reduced to a very small sub-array (e.g. 24×36 pixels, each encoded at sixteen bits per color) for application to the scene balance mechanism through which high resolution imagery data is mapped into the framestore.

This very low resolution (24×36) digitized image is then analyzed in step 102 by the scene balance mechanism to determine how the response characteristic of the scanner's imaging pixel array sees the image and encodes its spatial content. The scene balance mechanism (the processed result of which may be implemented as a set of look-up tables (LUTs), one for each RGB color) outputs three values, one for each color, which represent the color balance content of the digitized image.

In step 103, using these values, the sensitivity of the scanner is calibrated, so that, during a subsequent high resolution scan of the image, the essential subject matter of the image will fall within the linear portion of the response range of the scanner's imaging pixel array. While the scene balance output values may be employed to effect vernier adjustments of reference voltages for the scanner's imaging array, in accordance with a preferred mode of the present invention, a respective offset code, one for each of the color values, is added to the inputs of each scene balance look-up table in order to effectively shift or translate its mapping function that brings the essential subject matter of the image into the linear portion of the response range of the scanner's imaging pixel array.

With the scanner now calibrated, (e.g. scene balance look-up tables shifted to optimize the use of the imaging array's linear response range), the scanner is controlled in step 104 to execute a high resolution scan of the image. Since the scene balance LUTs have been translated in accordance with the output of the low resolution prescan, the high resolution digitized image will be mapped into the framestore such that essential image information (i.e. that which is necessary to obtain a high quality print) is captured and stored.

As pointed out above, in a highly automated photofinishing system, wherein successive image frames of a continuous reel of color photographic film, such as a spliced-together sequence of 35 mm film strips, are prescanned at low spatial resolution and then rescanned to derive a color balanced, high spatial resolution digitized image, there is a potential problem of image misalignment or lack of image synchronization between the low and high resolution scans. Namely, should there be a mismatch between prescan imagery data and a high resolution frame, the wrong prescan-based calibration information would be used during the high resolution scan, and an unacceptable image mapped into memory.

To prevent such misalignment, the present invention employs a synchronization scheme that does not rely exclusively on detecting frame location notches, but uses other detected frame identification information independently or in combination with the notches to improve the reliability of the scanner calibration for each processed image. Pursuant to the invention, when the reel of color photographic film (comprised of one or more spliced together film strips) is initially scanned at low resolution by the opto-electronic film scanner, a plurality of first digital codes, each of which representative of a prescribed attribute of a respective scanned image, is generated and stored.

Figure 3:
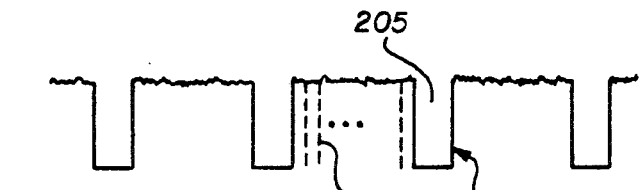
FIG. 3 diagrammatically illustrates an exemplary output of an opto-electronic scanner.
Figure 4:
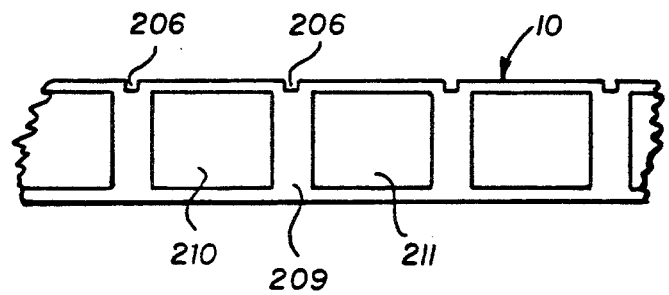
FIG. 4 diagrammatically illustrates a sequence of image frames on a color photographic film strip.

As diagrammatically illustrated in FIG. 3, which shows an exemplary output of an opto-electronic scan of film strip 10, a portion of which is shown in FIG. 4, this first code may represent a statistical measure of the contents of an image frame, e.g. a summation of the image contents of each of the columns 201 of the low spatial resolution pixel sub-array. Alternatively, or in addition to the first code, a second code, representative of the location of a respective interframe gap 205, for example, a separation between successive image frames 210, 211 on the film strip 10, may be generated. The location of interframe gaps 205, whereat frame registration notches 206 along the edge of the film should be placed, is readily accomplished by observing what is effectively a stepwise variation 207 in the output of the scanner as non-image regions 209 of the film are scanned during the film's movement past the scanner's imaging optics. Each of the plurality of first digitally encoded images is then processed in accordance with the scene balance mechanism, as described above, to derive a calibration code representative of the color content of the image.

After the entire reel has been scanned at low resolution and first and second codes stored for each image, photographic film strip 10 is translated past the opto-electronic scanning device in a reverse direction, so as to effect a rescanning of the plurality of photographic images, but in an order opposite to that of the original scan. The rescan of each image is conducted at a second, high spatial scanning resolution to produce a plurality of second digitally encoded images. During the rescan of each image, a third signal, in the form of a third digital code, representative of the prescribed attribute of the scanned image, is generated and stored. As in the case of the first code, the third signal may represent a statistical measure of the contents of the image, such as a summation of the image contents of those columns of the image array corresponding to the columns of the low spatial resolution pixel sub-array. Each second digitally encoded image is then mapped into memory using a scene balance mechanism that has been calibrated in accordance with a respective scene balance calibration signal, as described above with reference to FIG. 2.

To ensure that the correct calibrated scene balance mechanism is employed during the high resolution scan, its selection may be based upon a combination (correlation) of the first and third statistical measure representative codes, or by looking for the presence of interframe gap 205, as represented by the second code, in addition to frame-demarcating notch 206. Namely, the output of a notch detector 17, which looks for the presence of notches during the rescan, is augmented by other data that is derived during pre-scan of the film. For this purpose, the output of notch detector 17 and the second code signal may be logically combined (e.g. ORed) to identify the location of the successive image frames. Notch detection may also be supplemented by comparing how closely (within a prescribed window), the first and third statistical measure codes match. In effect, each first and third code may be considered to be a 'fingerprint' of the image. If these 'prints' match, it is inferred that the correct scene balance calibration has been selected for the image of interest, so that the manner in which each successive high resolution digitized image is mapped into memory will be optimized, so that the essential subject matter of each image will fall within the linear portion of the response range of the scanner's imaging pixel array. The high resolution digitized image is then mapped by the scene balance mechanism into a reduced encoding resolution framestore.

As will be appreciated from the foregoing description, the 'missed notch' spatial synchronization problem encountered in multiscan photofinishing operations is effectively obviated in accordance with the present invention by the use of auxiliary information derived during the prescan of the image. This auxiliary information is used to supplement the frame-locating function of each notch, so that even if a notch is missed during the high resolution scan, spatial synchronization between each frame and its associated prescan-derived control information will be maintained. As a consequence, the present invention is particularly applicable to a highly automated digital imagery processing system, wherein successive image frames of a continuous reel of color photographic film, such as a spliced-together sequence of 35 mm film strips, are prescanned at low spatial resolution and then rescanned to derive a color balanced, high spatial resolution digitized image.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of controlling the manner in which a plurality of color photographic images that have been captured on a continuous color photographic film strip are scanned by an opto-electronic scanning device and processed for storage as a plurality of digitized images in a digital imagery data base, said film strip containing physical demarcations associated with the locations of respective ones of said images thereon, comprising the steps of:
    (a) translating said photographic film strip with respect to said opto-electronic scanning device so as to effect a sequential scanning of said plurality of photographic images at a first, low spatial scanning resolution and thereby producing a plurality of first digitally encoded images;
    (b) translating said photographic film strip with respect to said opto-electronic scanning device so as to effect a sequential rescanning of said plurality of photographic images at a second, high spatial scanning resolution and thereby producing a plurality of second digitally encoded images;
    (c) mapping respective ones of said plurality of second digitally encoded images into image storage memory on the basis of the contents of respective ones of said plurality of first digitally encoded images, selected exclusive of said physical demarcations.

2. A method according to claim 1, wherein step (c) comprises mapping respective ones of said plurality of second digitally encoded images into image storage memory on the basis of the contents of respective ions of said plurality of first digitally encoded images, selected on the basis of a prescribed relationship between the contents of first digitally encoded images with second digitally encoded images.

3. A method according to claim 1, wherein said physical demarcations correspond to notches in said film strip.

4. A method according to claim 1, wherein step (a) comprises translating said photographic film strip in a first direction relative to said opto-electronic scanning device, so as to scan successive ones of first through N photographic images on said film strip, and step (b) comprises translating said photographic film strip in a second, reverse direction, relative to said opto-electronic scanning device, so as to scan successive ones of N through first photographic images on said film strip.

5. A method according to claim 2, wherein, in step (c), said prescribed relationship corresponds to a correlation of statistical measures of the contents of said first and second digitally encoded images.

6. A method of controlling the manner in which a plurality of color photographic images that have been captured on a color photographic image recording medium are scanned by an opto-electronic scanning device and processed for storage as a plurality of digitized images in a digital imagery data base, comprising the steps of:
(a) scanning said plurality of photographic images at a first, low resolution to produce a plurality of first digitally encoded images, and processing each first digitally encoded image in accordance with a prescribed image processing mechanism to derive, for each image, a firs signal representative of a first prescribed attribute of said image;
(b) generating second signals representative of physical demarcations associated with the locations of respective ones of said plurality of images on said photographic recording medium;
(c) rescanning said plurality of photographic images at a second, high resolution, to produce a plurality of second digitally encoded images, and processing each second digitally encoded image in accordance with said prescribed image processing mechanism adjusted in accordance with a respective one of the first signals produced in step (a) and selected in accordance with said second signals; and wherein step (a) further comprises generating third signals representative of a measure of the contents of each of said first digitally encoded images, and step (c) further comprises generating fourth signals representative of a measure of the contents of each of said second digitally encoded images, and wherein each second digitally encoded image is selected in accordance with a prescribed relationship between said third and fourth signals.

7. A method according to claim 6, wherein said prescribed image processing mechanism comprises a scene balance mechanism and wherein said first prescribed attribute corresponds to image color content.

8. A method of controlling the manner in which a plurality of color photographic images that have been captured on a color photographic image recording medium are scanned by an opto-electronic scanning device and processed for storage as a plurality of digitized images in a digital imagery data base, comprising the steps of:
(a) scanning said plurality of photographic images at a first, low resolution to produce a plurality of first digitally encoded images, and processing each first digitally encoded image in accordance with a scene balance mechanism to derive, for each image, a first signal representative of the color content of said image, and producing, for each image, a second signal representative of a measure of the contents of that image; and
(b) rescanning said plurality of photographic images at a second, high resolution, to produce a plurality of second digitally encoded images, and producing for each second image a third signal representative of a measure of the contents of that image, and processing each second digitally encoded image in accordance with a scene balance mechanism that has been calibrated in accordance with a respective one of the first signals produced in step (a) and selected in accordance with a prescribed relationship between said second and third signals, so as to obtain a color content-balanced digitized image.

9. A method according to claim 8, wherein step (a) comprises scanning said photographic recording medium in a first direction so as to scan successive ones of first through N photographic images, and step (b) comprises scanning said photographic recording medium in a second, reverse direction, so as to scan successive ones of N though first photographic images.

10. A method of controlling the manner in which a plurality of color photographic images that have been captured on a continuous color photographic film strip are scanned by an opto-electronic scanning device and processed for storage as a plurality of digitized images in a digital imagery data base, comprising the steps of:
(a) translating said photographic film strip with respect to said opto-electronic scanning device so as to effect a sequential scanning of said plurality of photographic images at a first, low spatial scanning resolution and thereby produce a plurality of first digitally encoded images;
(b) producing, for each image scanned in step (a), a first signal representative of a measure of the contents of that scanned image;
(c) processing each first digitally encoded image in accordance with a scene balance mechanism to derive, for each image, a second signal representative of the color content of said image;
(d) translating said photographic film strip with respect to said opto-electronic scanning device so as to effect a rescanning of said plurality of photographic images at a second, high spatial scanning resolution and thereby produce a plurality of second digitally encoded images;
(e) producing, for each image scanned in step (d), a third signal representative of a measure of the contents of that scanned image; and
(f) processing each second digitally encoded image in accordance with a scene balance mechanism that has been calibrated in accordance with a respective one of the second signals produced in step (c) and selected in accordance with a prescribed relationship between said first and third signals.

11. A method according to claim 10, wherein step (a) comprises translating said photographic film strip in a first direction relative to said opto-electronic scanning device, so as to scan successive ones of first through N photographic images on said film strip, and step (d) comprises translating said photographic film strip in a second, reverse direction, relative to said opto-electronic scanning device, so as to scan successive ones of N through first photographic images on said film strip.

12. An apparatus for controlling the manner in which a plurality of color photographic images that have been captured on a continuous color photographic film strip are scanned and processed for storage as a plurality of digitized images in a digital imagery data base, said film strip containing physical demarcations associated with the locations of respective ones of said images thereon, comprising, in combination:

an opto-electronic scanning device arranged to optically scan said film strip during mutual relative translation of said film strip with respect to said scanning device;

means for translating said photographic film strip with respect to said opto-electronic scanning device so that said scanning device sequentially scans said plurality of photographic images at a first, low spatial scanning resolution and produces a plurality of first digitally encoded images, and thereafter translating said photographic film strip with respect to said opto-electronic scanning device so that said scanning device sequentially rescans said plurality of photographic images at a second, high spatial scanning resolution and produces a plurality of second digitally encoded images; and an image processor which maps respective ones of said plurality of second digitally encoded images into an image storage memory on the basis of the contents of respective ones of said plurality of first digitally encoded images, selected exclusive of said physical demarcations.

13. An apparatus according to claim 12, wherein said image processor includes means for mapping respective ones of said plurality of second digitally encoded images into said image storage memory on the basis of the contents of respective ones of said plurality of first digitally encoded images, selected on the basis of a prescribed relationship between the contents of first digitally encoded images with second digitally encoded images.

14. An apparatus according to claim 12, wherein said translating means includes means for translating said photographic film strip in a first direction relative to said opto-electronic scanning device, so as to scan successive ones of first through N photographic images on said film strip, and thereafter translating said photographic film strip in a second, reverse direction, relative to said opto-electronic scanning device, so as to scan successive ones of N through first photographic images on said film strip.

15. An apparatus according to claim 12, wherein said prescribed relationship corresponds to a correlation of statistical measures of the contents of said first and second digitally encoded images.

16. An apparatus for scanning a plurality of color photographic images that have been captured on a color photographic image recording medium processing scanned images for storage as a plurality of digitized images in a digital imagery data base, comprising, in combination:

an opto-electronic scanning device, optically coupled with said color photographic recording medium so as to optically scan said plurality of photographic images at a first, low resolution and producing a plurality of first digitally encoded images;

imagery data processing means for processing each first digitally encoded image in accordance with a scene balance mechanism to derive, for each image, a first signal representative of the color content of said image, and producing, for each image, a second signal representative of a statistical measure of the contents of that image; and wherein said opto-electronic scanning device is controlled to rescan said plurality of photographic images at a second, high resolution, to produce a plurality of second digitally encoded images, and producing, for each second image, a third signal representative of a statistical measure of the contents of that image, and wherein said imagery data processing means includes means for processing each second digitally encoded image in accordance with a scene balance mechanism that has been calibrated in accordance with a respective one of said first signals and selected in accordance with a prescribed relationship between said second and third signals, so as to obtain a color content-balanced digitized image.

17. An apparatus according to claim 16, wherein said opto-electronic scanner scans said photographic recording medium in a first direction so as to scan successive ones of first through N photographic images, and thereafter scans said photographic recording medium in a second, reverse direction, so as to scan successive ones of N though first photographic images.

18. An apparatus for controlling the manner in which a plurality of color photographic images that have been captured on a continuous color photographic recording medium are scanned, processed for storage as a plurality of digitized images in a digital imagery data base and reproduced, said recording medium containing physical demarcations associated with the locations of respective ones of said images thereon, comprising, in combination:

an opto-electronic scanning device arranged to optically scan said photographic recording medium during mutual relative translation of said photographic recording medium with respect to said scanning device;

means for translating said photographic recording medium with respect to said opto-electronic scanning device so that said scanning device sequentially scans said plurality of photographic images at a first, low spatial scanning resolution and produces a plurality of first digitally encoded images, and thereafter translating said photographic recording medium with respect to said opto-electronic scanning device so that said scanning device sequentially rescans said plurality of photographic images at a second, high spatial scanning resolution and produces a plurality of second digitally encoded images;

an image processor which maps respective ones of said plurality of second digitally encoded images into an image storage memory on the basis of the contents of respective ones of said plurality of first digitally encoded images, selected exclusive of said physical demarcations; and an image reproduction device for reproducing images captured on said photographic recording medium in accordance with the operation of said image processor.

19. An apparatus according to claim 18, wherein said image processor includes means for mapping respective ones of said plurality of second digitally encoded images into said image storage memory on the basis of the contents of respective ones of said plurality of first digitally encoded images, selected on the basis of a prescribed relationship between the contents of first digitally encoded images with second digitally encoded images.

* * * * *

UNITED STATES PATENT AND TRADEMARK OFFICE
CERTIFICATE OF CORRECTION

PATENT NO. : 5,157,482
DATED : October 20, 1992
INVENTOR(S) : Patrick A. Cosgrove It is certified that error appears in the above-indentified patent and that said Letters Patent is hereby corrected as shown below:

Column 8, claim 2, line 58, "ions" should be --ones--.
Column 9, claim 6, line 23, "firs" should be --first--.

Signed and Sealed this

Twenty-seventh Day of September, 1994

Attest:

BRUCE LEHMAN

*Attesting Officer*  *Commissioner of Patents and Trademarks*